United States Patent [19]

Layotte et al.

[11] 4,296,828
[45] Oct. 27, 1981

[54] MOBILE DEVICE FOR GENERATING ACOUSTIC SHEAR WAVES

[75] Inventors: Pierre-Claude Layotte, Les Mathes; Andre James, Royan, both of France

[73] Assignee: Institut Francais du Petrole, Ruell-Malmaison, France

[21] Appl. No.: 55,098

[22] Filed: Jul. 5, 1979

[30] Foreign Application Priority Data

Jul. 5, 1978 [FR] France .................................. 78 20009

[51] Int. Cl.³ ............................................. G01V 1/047
[52] U.S. Cl. ..................................... 181/121; 181/114; 181/401; 367/75
[58] Field of Search ............... 181/114, 119, 121, 401; 367/75; 248/206 R

[56] References Cited

U.S. PATENT DOCUMENTS

| | | | |
|---|---|---|---|
| 1,577,608 | 3/1926 | Brewer | 248/206 R |
| 2,910,134 | 10/1959 | Crawford et al. | 181/121 |
| 3,185,250 | 5/1965 | Glazier | 181/401 |
| 3,677,951 | 7/1972 | Alles | 248/206 R |
| 4,020,919 | 5/1977 | Broding | 181/401 |
| 4,050,540 | 9/1977 | Cholet et al. | 367/75 |
| 4,118,994 | 10/1978 | Layotte et al. | 367/75 |

*Primary Examiner*—Howard A. Birmiel
*Attorney, Agent, or Firm*—Millen & White

[57] ABSTRACT

A mobile device is used which includes a target-member adapted for coupling to the earth and a means for striking the target-member so as to generate acoustic shear waves.

The target-member is coupled to the earth through a deformable coupling member secured to the rigid frame of the target-member, the coupling being enhanced by the combination of a suction means and a network of channels arranged on the face of the coupling member which is in contact with the earth, whereby a partial vacuum is created between the coupling member and the earth.

8 Claims, 4 Drawing Figures

MOBILE DEVICE FOR GENERATING ACOUSTIC SHEAR WAVES

BACKGROUND OF THE INVENTION

This invention relates to an improved device for generating acoustic shear waves in the earth, which is particularly adapted to seismic prospecting on land.

One known prior art device is adapted to generate acoustic shear waves which comprises essentially a target-member having a surface for coupling with the earth and a mass for striking the target-member in a direction substantially parallel to the earth surface.

The mass is connected to means a for applying thereto a velocity of predetermined amplitude thereto having a component parallel to the coupling surface and the direction of which can be oriented with respect to the target-member. The means for applying comprises for example, one arm supporting the mass at one of its ends and adapted to pivot at its opposite end with respect to the frame of a carrying vehicle, when actuated by driving means.

The target-member for example, is suspended from articulated arms on a carrying vehicle and is adapted to be vertically displaced from a position of transportation to a working position where it is in contact with the earth. In this working position, a portion of the weight of the vehicle bears on the target-member. For this purpose, the target-member includes tracks on which at least one axle of the vehicle with its wheels is caused to climb.

Moreover, there can be used a target-member having a coupling surface with the earth which is includes spikes or excrescenses which penetrate into the earth and contribute to the fastening of the device to the earth and to enhance the coupling and the power efficiency of the apparatus.

Such a device is described, for example, in U.S. Pat. Nos. 4,050,540 and 4,118,994.

The disadvantage of such coupling means is that it is not well adapted for use on very hard soils such as paths or roads where the excrescenses or protruding elements cannot penetrate without great difficulty. As a result of the impacts which are laterally applied thereto by the mass, the target-member undergoes translational motion which absorbs a part of the generated power. The result is a substantial decrease of the efficiency of the device.

SUMMARY OF THE INVENTION

The present invention has as an object providing a device adapted for generating acoustic shear waves, comprising an improved target-member which is particularly well adapted for use on to hard soils where the protruding elements as used as the prior art cannot penetrate. The invention comprises a mass for striking the target-member when the latter is coupled to the earth and a means for imparting to the mass a velocity having a component parallel to the coupling surface.

The device comprises a means cooperating with a suction system for fixedly coupling the target-member to the earth surface. The target-member comprises, for example, a rigid frame and a means for fastening it to the earth surface comprising a deformable coupling element on which is secured said frame.

The coupling element advantageously comprises a mat made of flexible material and provided at its periphery with a deformable strip.

BRIEF DESCRIPTION OF THE DRAWINGS

Other characteristics and advantages will be made apparent from the following description of a non-limitative embodiment of the device given with reference to the accompanying drawings, wherein.

DETAILED DESCRIPTION OF THE INVENTION

Figure 4:
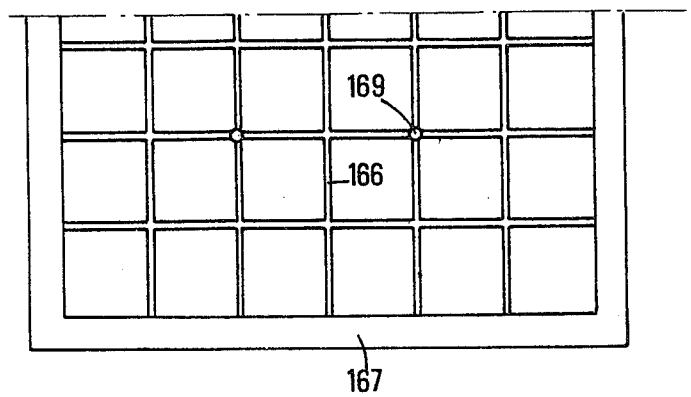
FIG. 4 shows a view from below of the mat.
Figure 2:
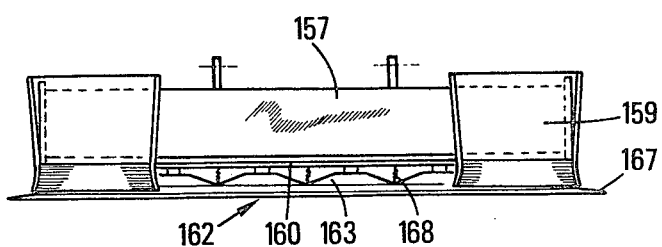
FIG. 2 is a diagrammatic side view of the target-member.
Figure 3:
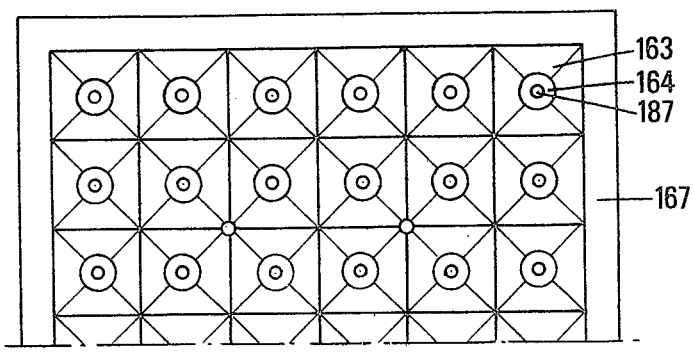
FIG. 3 is a top view of the mat forming the coupling element.
Figure 1:
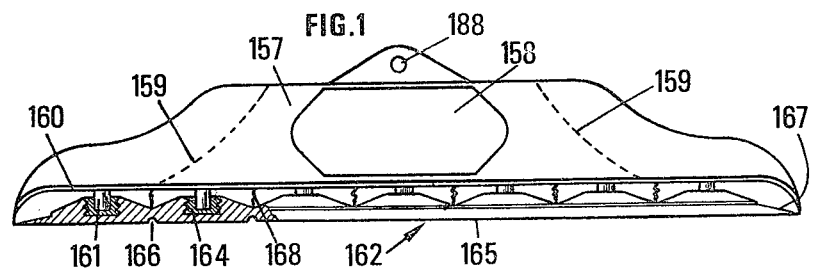
FIG. 1 is a diagrammatic front view of the target-member.

The target-member comprises (FIGS. 1 to 4) a rigid metal frame 157 provided with striking plates 158 on two opposite side walls. The upper surface of the frame 157 comprises tracks 159 which are profiled and inclined towards two opposite ends in order to facilitate the climbing thereon of the wheels of at least one axle of a carrying vehicle. The rigid frame 157 comprises a bed plate 160 having lugs 161 extending downwardly therefrom. The rigid frame is secured to a coupling assembly made up essentially of a mat 162 having a size adapted to that of the bed plate 160. The mat 162 comprises a mosaic of adjacently located pyramidal frustums 163 made of flexible material such as, for example, polyurethane. At the center of each pyramid frustum and at its upper portion, (FIGS. 1 and 3) is embedded a metal element 164 provided with a cylindrically shaped central housing 187 which is also embedded for each one of the lugs 161 of the bed plate 160.

The lower face 165 of the mat 162 includes grooves or is corrugated as a result of a squaring of channels 166 located at small distances from each other, enabling it to substantially adapt and correspond in shape to an irregular ground surface. The mat 162 is bound about its periphery with a strip, skirt or rim 167 which delimitates a substantially well defined and isolated area between the target-member and the earth.

The mat 162 is secured onto the bed plate 160 of the rigid frame 157 by deformable connection means such as cables or chains 168 which limit the maximum displacement allowed to of the rigid frame 157 with respect to the mat 162. This displacement is permanantly guided and limited by the sliding of the lugs 161 within their respective housings 187.

The squaring network of channels under the mat 162 communicates, through four orifices 169, with pipes which are connected to a suction system, carried on the vehicle and not shown. Finally, the rigid frame includes anchoring points 188 for securing the target-member to the vehicle.

The mass and the means, which are not shown, for displacing the target-member and imparting to the mass a velocity having a component parallel to the coupling surface, may be, by way of non-limitative example, such as those described in U.S. Pat. Nos. 4,050,540 and 4,118,994.

The coupling of the target-member with the earth on which it is laid down is obtained by pressing, with a part of the vehicle weight, on the tracks arranged at the upper portion of the rigid frame 157 and/or by actuating the suction system which generates a partial vacuum, through the channels, in the volume or space defined by the earth, the mat 162 and the lateral skirt 167.

Preferably, the weight and depression effects are combined to couple the target-member with the earth.

What is claimed is:

1. A device for generating acoustic shear waves in the earth comprising;
   a target-member having a coupling surface for coupling with the earth;
   mass means for striking said target-member when coupled to the earth;
   moving means operatively associated with said mass means for imparting to said mass means a velocity component parallel to said coupling surface;
   coupling means comprising a plurality of independent zones on said coupling surface for coupling with the earth; and suction means connected to said target-member for generating a suction in each zone of said plurality of independent zones for coupling said target-member with the earth at said each zone.

2. A device according to claim 1, wherein said target-member comprises a rigid frame, coupling means for fixedly coupling said target-member to the surface of the earth comprising a deformable coupling member having said rigid frame secured thereto.

3. A device according to claim 2, wherein said coupling member comprises a mat made of flexible material and having a deformable stip around its periphery.

4. A device according to claim 3, wherein the surface of said mat adapted to contact the earth includes an assembly of channels communicating, through orifices arranged through said mat, with said suction means.

5. A device according to claim 4, further comprising deformable connection means connecting said mat to said rigid frame.

6. A device according to claim 5, wherein said mat comprises a mosaic of adjacent pyramidal shaped frustums having embedded metal elements each including respective housings for lugs secured to said rigid frame.

7. A device according to claim 2, characterized in that said rigid frame comprises anchoring points for the connection of said target-member to a vehicle.

8. A device according to claim 1, 2, 3, 4, 5, 6, or 7, characterized in that said rigid frame comprises at least one inclined track for allowing a vehicle to be mounted on said target-member by placing the vehicle wheels on said inclined track.

* * * * *